US007676760B1

(12) United States Patent
Rosenquist et al.

(10) Patent No.: US 7,676,760 B1
(45) Date of Patent: Mar. 9, 2010

(54) METHODS AND APPARATUS FOR ANALYSIS OF ACCESS LOGS

(75) Inventors: Brent Rosenquist, San Jose, CA (US); Edward R Rowe, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1256 days.

(21) Appl. No.: 11/066,115

(22) Filed: Feb. 25, 2005

(51) Int. Cl.
*G06F 3/048* (2006.01)

(52) U.S. Cl. ...................... 715/789; 715/745; 715/811; 715/833

(58) Field of Classification Search ................ 715/838, 715/754, 745, 789, 811, 833; 345/764, 647, 345/700
See application file for complete search history.

(56) References Cited

U.S. PATENT DOCUMENTS

| | | | | |
|---|---|---|---|---|
| 5,265,246 A | * | 11/1993 | Li et al. | 707/4 |
| 5,644,692 A | * | 7/1997 | Eick | 715/833 |
| 6,151,624 A | * | 11/2000 | Teare et al. | 709/217 |
| 6,421,071 B1 | * | 7/2002 | Harrison | 715/787 |
| 7,106,349 B2 | * | 9/2006 | Baar et al. | 345/647 |
| 2002/0070953 A1 | * | 6/2002 | Barg et al. | 345/700 |
| 2002/0085034 A1 | * | 7/2002 | Cortright | 345/764 |
| 2003/0061352 A1 | * | 3/2003 | Bohrer et al. | 709/226 |

* cited by examiner

*Primary Examiner*—William L Bashore
*Assistant Examiner*—Sherrod Keaton
(74) *Attorney, Agent, or Firm*—Chapin IP Law, LLC; Barry W. Chapin, Esq.

(57) ABSTRACT

An access log analyzer processes an access log to identify file access information associated with accessed regions of one or more files. Based on information in the access log as well as information potentially retrieved from the other sources such as a file system or disk on which the files are stored, the access log analyzer initiates display of a respective graphical representation for each of the one or more files. In addition to displaying the graphical representations themselves, the access log analyzer displays visual renderings at relative locations in association with the graphical representations to identify accessed regions of the one or more file as indicated by the file access information in the access log. Accordingly, a user can view a visual depiction of the contents of a disk access log and easily identify respective access patterns associated with the one or more files.

34 Claims, 10 Drawing Sheets

METHODS AND APPARATUS FOR ANALYSIS OF ACCESS LOGS

BACKGROUND

Computer systems are capable of storing vast amounts of data and information. To store such information, a typical computer system maintains a logical data structure called a file system that serves as an index of individually accessible data repositories commonly known as files. A typical file system may provide a hierarchical arrangement of directories, sometimes referred to as folders, and each directory or folder is able to maintain the identity of individual files stored within that directory or folder.

Each file in a directory of a file system may have a file name, as well as other metadata associated with that file, such as the size (e.g., in bytes) of the file, an identify of an owner or creator or the file, a set of access permissions associated with the file, and so forth. The actual data associated with the file is said to be stored "within" the file, but is actually data that is encoded at various locations with one or more storage devices such as an optical or magnetic disk drives, or within memory in the computer system. For each file listed in a file system, the file system maintains a pointer, sometimes called a "file handle," that identifies a specific location within a data storage system that identifies the beginning of the data for that file. When a program executing on the computer system needs to access (e.g., read or write) data to or from that file, the program can make a sequence of system calls to an operating system executing in the computer in order to, for example, open the file and read or write data to the file. As a program reads or writes data to or from the file, the file system, which is often part of the operating system, tracks the current location in the file where data was last written to or read from for each file. Operating system developers and third party application developers have created conventional tools to record, within an access log, all access events (e.g., opens, reads, writes, closes, etc.) to a selected group of one or more files.

Accordingly, computer system managers and software developers use such log file creation tools to produce access logs that record access events (e.g., a read) associated with stored data, such as accesses to one or more files stored on a disk. In a typical application, each access event recorded in a respective access log includes a start byte, a stop byte (or alternatively an offset byte value from the start byte), and a time stamp. Depending on the complexity of the log file creation tool, other information may be stored as well, such as the identity of the program performing the access. A range of bytes between the start byte and the end byte indicates what portion of the file was accessed at a given time as indicated by the time stamp. Such recorded information in a respective access log can be analyzed to determine patterns of accessing data from, for example, a disk and/or a cache.

Accordingly, computer system managers and software developers use such log file creation tools to produce access logs that record access events (e.g., a read) associated with stored data, such as accesses to one or more files stored on a disk. In a typical application, each access event recorded in a respective access log includes a start byte, a stop byte (or alternatively an offset byte value from the start byte), and a time stamp. Depending on the complexity of the log file creation tool, other information may be stored as well, such as the identity of the program performing the access. A range of bytes between the start byte and the end byte indicates what portion of the file was accessed at a given time as indicated by the time stamp. Such recorded information in a respective access log can be analyzed to determine patterns of accessing data from, for example, a disk and/or a cache.

One conventional method of analyzing access logs for the purpose of recognizing patterns is to use a text editor to open an access log and analyze which regions of a file have been accessed by different processes running on a computer. That is, according to one conventional method, a user can open an access log via a text editor to study and interpret textual data in the access log. Based on reading the textual data, the user can identify specific details such as when and where accesses typically occur in a file. Additionally, the user can identify different sizes associated with accesses to a disk.

One purpose of analyzing the access logs as briefly mentioned above is to identify access patterns associated with a disk and, more particularly, one or more files stored on a disk. Based on identified access patterns, the data stored in a respective file can be more efficiently stored on a disk. For example, based on data in the access log, if two regions of a disk are often accessed at nearly the same time, but they are always retrieved one after the other, a user may decide to reconfigure how the file is stored to disk so that the first range of data and the second range of data in the file are stored relatively close to each other on disk. Storing the first and second range of data closer to each other on a disk reduces the amount of distance (and therefore time) required for a mechanical head reading from the disk to jump from one region to another when reading the first region and second region, one after the other.

SUMMARY

Conventional access log analyzers suffer from a number of deficiencies. For example, conventional techniques of analyzing access log information do not enable a user to easily analyze data and recognize access patterns contained in a disk access log. As discussed above, one conventional method involves a brute force method of reviewing access logs via use of a text editor in which a user studies textual content of the access logs to identify complex disk access patterns. Because text-based access logs can be quite long and cryptic, discerning access patterns (e.g., contiguous reads, sequential reads, etc.) via use of a text editor can be quite difficult and time-consuming.

In addition, log analyzers typically do not provide meaningful statistical data so that the user can easily compare sets of access data. For example, to get a sense of how accesses to one file compare to those of another file, the user of the text editor must manually sort through textual contents of the access logs and manually generate meaningful comparison data.

Techniques discussed in this application deviate with respect to conventional access log analyzers such as those discussed above as well as additional access log analyzers techniques also known in the prior art. In particular, embodiments of the present application include mechanisms and techniques to: process an access log to identify file access information associated with accessed regions of a file; display a graphical representation of the file; and display visual renderings at relative locations in association with the graphical representation to identify accessed regions of the file as indicated by the file access information in the access log. Accordingly, a technique as further described herein involves displaying visual renderings of accesses to a disk (e.g., visually depicting contents of a disk access log) so that a respective user can more easily identify access patterns.

More specifically, according to one configuration of the present application, an access log analyzer keeps track of multiple computer processes that access multiple files stored in a disk or a combination disk/cache. The log analyzer displays graphical representations of files accessed by the computer processes. For example, the logic analyzer produces a two dimensional image representing a respective file. The log analyzer sizes each of the graphical representations depending on a size of a corresponding file they represent. Larger files have larger associated graphical representations while smaller files have smaller associated graphical representations. When displaying graphical representations of different sized files in this way, a user can easily identify (based on a size of the graphical representations) a relative size of the accessed files with respect to each other. One method of learning sizes associated with respective files is to retrieve such information from other sources (e.g., disk, file system, file on disk, etc.) if the information is not stored in the access log.

For each of the graphical representations of files displayed in a graphical user interface, as briefly mentioned, the access log analyzer displays a visual rendering of a given access to a respective file via use of a line or filled in region between a start byte and end byte associated with the given access. The visual rendering of a respective access appears at a relative position of the graphical representation depending where the access occurred in the file. For example, the access log analyzer displays a visual rendering of the given access so that it appears at a relative position in the respective graphical representation file so that the user can view the respective graphical representation and quickly identify whether the given access occurred at the beginning, middle, or end of the file. Also, based on a size of the visual rendering of a respective access in relation to the corresponding graphical representation of the file, the user can identify a relative length of an access with respect to a size of the file.

The visual rendering of an access to a file can be uniquely displayed via use of different display attributes in order to differentiate one type of access with respect to another. For example, the access log analyzer can "color code" the visual renderings of accesses in the graphical representations to differentiate which of multiple processes performs respective accesses to the files. That is, all visual renderings of accesses of a first color are performed by a first process accessing the file, all visual renderings of accesses of a second color are performed by a second process accessing the file all, and so on.

The access log analyzer can also display a legend for different data types of information in the graphical representation so that a user can identify what types of data are stored in different ranges of a respective file. For example, each of the graphical representations can include a color-coded bar (each color corresponding to a different type of data) in relation to a graphical representation to indicate which ranges within of a file store respective types of data. Accordingly, a user viewing the graphical representation can quickly identify a type of data associated with a particular access to a respective file as well as which portions of the respective file store which types of data.

Other embodiments include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below.

One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the invention can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA.

As discussed above, techniques of the present application are well suited for use in computer systems that perform analysis of access logs. However, it should be noted that embodiments of the present application are not limited to use in such applications and that the techniques discussed herein are well suited for other applications as well. Additional features of the present application will be further discussed via the Detailed Description section of this application as well as accompanying figures.

BRIEF DESCRIPTION OF THE DRAWINGS

The foregoing and other objects, features, and advantages of the present application will be apparent from the following more particular description of preferred embodiments of the present application, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one implementation of the present application, an access log analyzer processes an access log to identify file access information associated with accessed regions of one or more files. The access log analyzer can retrieve additional information (e.g., size information) associated with the one or more accessed files from sources other than the access log such as a file system or disk on which the files are stored. Based on information in the access log as well as information retrieved from the other sources, the access log analyzer initiates display of a proportionally sized graphical representation for each of the one or more files. In addition to displaying the graphical representations themselves, the access log analyzer displays visual renderings at relative locations in association with the graphical representations to identify accessed regions of the one or more files as indicated by the file access information in the access log. Accordingly, a technique as further described herein involves displaying visual renderings of accesses to one or more files on a disk so that a respective user can view a visual depiction of the contents of a disk access log and more easily analyze access patterns.

Figure 1:
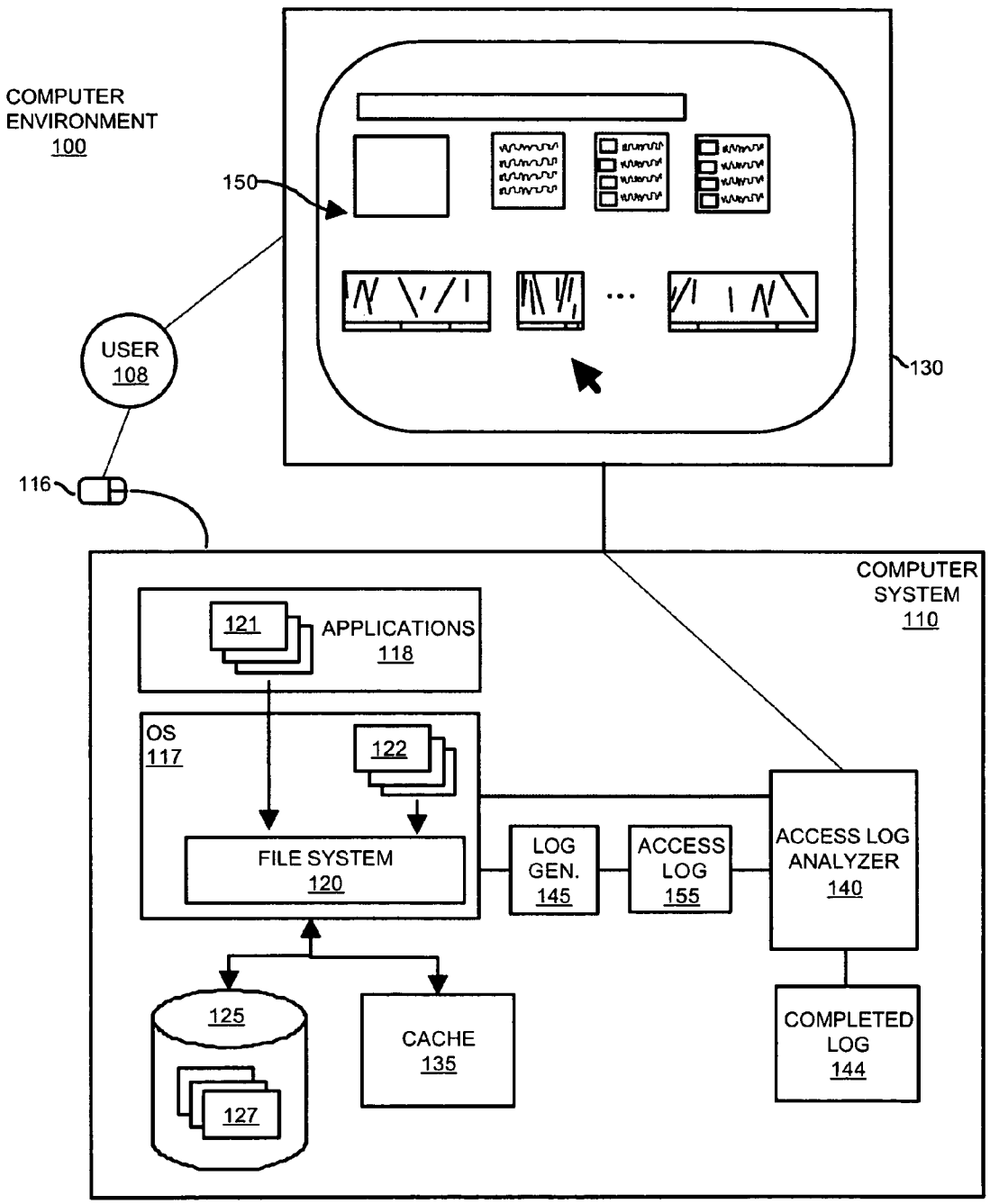
FIG. 1 is a diagram of a computer environment configured to support graphical analysis of access log information.

FIG. 1 is a block diagram illustrating computer environment 100 according to an embodiment of the present application. As shown, computer environment 100 includes computer system 110 and corresponding display 130 operated by user 108. Computer system includes peripheral devices 116 (e.g., keyboard, mouse, etc.), applications 118 and corresponding processes 121, operating system 117 and corresponding processes 122, file system 120, repository 125 storing files 127, cache 135, log generator 145, access log 155 (e.g., raw data access information), access log analyzer 140, and completed log 144. Display 130 of computer system 110 displays graphical user interface 150 for user 108. Actual implementations of computer environment 100 in the field can vary depending on the application.

In general, in the context shown, both processes 121 and processes 122 perform accesses (e.g., reads and/or writes) to file system 120 and contents (e.g., files 127) of repository 125 and cache 135. Log generator 145 produces access log 155, which includes information such as time of access, location of access, size of access, whether a cache hit occurred for the access, etc. associated with accesses to repository 125 and cache 135. Access log analyzer 140 processes data in access log 155 to produce graphical user interface 150 on display 130. Access log analyzer 140 optionally stores completed log 144 (e.g., archived analyzer generated information associated with a user session such as a .viz file) for later retrieval and use since information used to generate contents of graphical user interface 150 may not be available at a later time. Contents of graphical user interface 150 enables user 108 to view visual depictions of accesses to repository 125 as more particularly discussed in the following figures.

Figure 2:
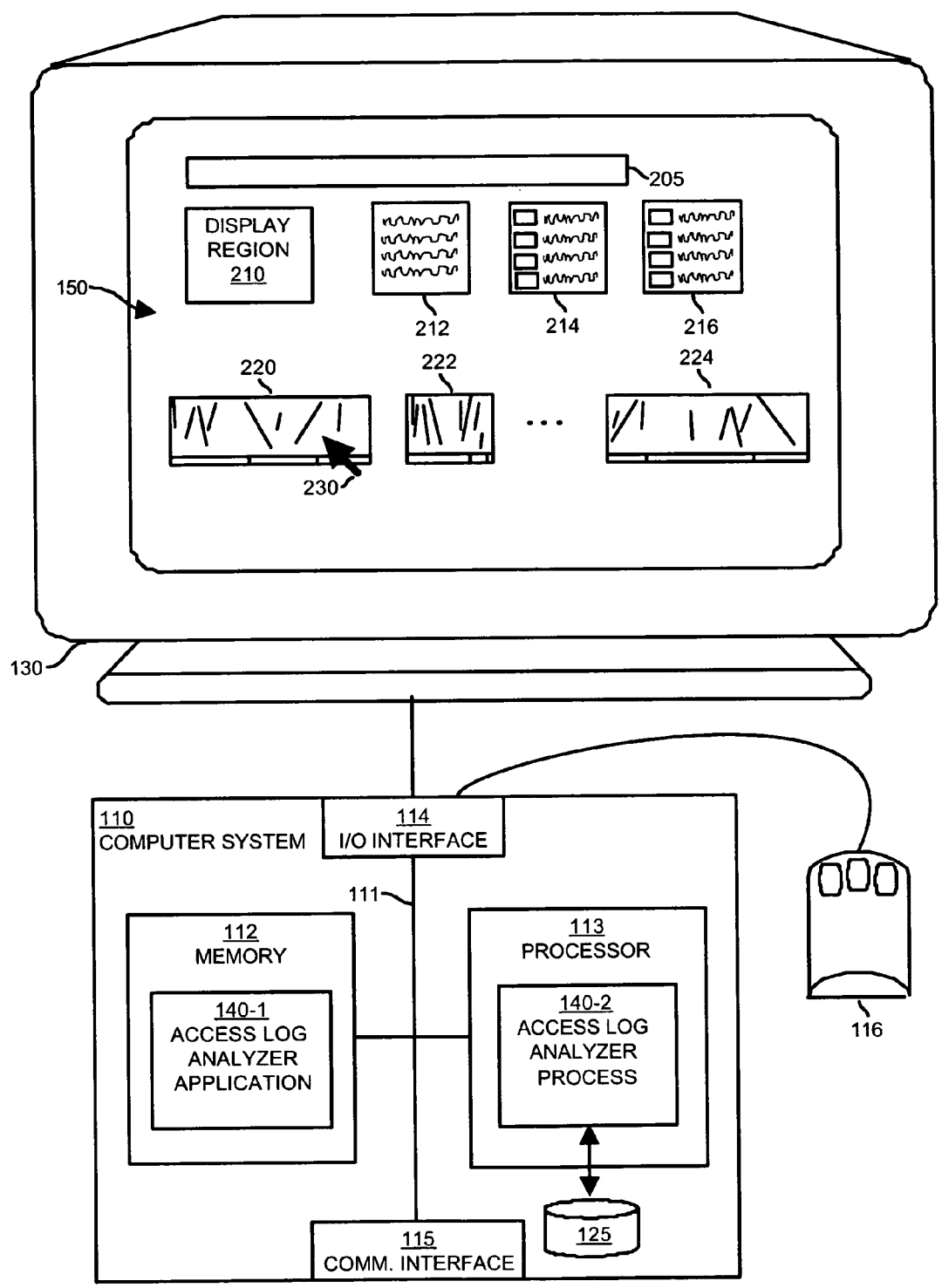
FIG. 2 is a diagram of a processing device suitable for executing a log analyzer process to generate a visualization of accesses and related statistical information.

FIG. 2 is a block diagram illustrating example architecture of a computer system 110 that executes, runs, interprets, operates or otherwise performs an access log analyzer application 140-1 and process 140-2 suitable for use in explaining example configurations herein. As shown, graphical user interface 150 on display 130 includes a tool bar 205 of selectable icons, display regions 210, 212, 214, and 216, graphical representations 220, 222, 224, and pointer 230 controlled by input device 116 (e.g., a handheld mouse). Computer system 110 may be any type of computerized device such as a personal computer, workstation, portable computing device, console, laptop, network terminal or the like.

As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, etc.) couples to processor 113 through I/O interface 114 and enables a user 108 to provide input commands and generally control the graphical user interface 150 that access log analyzer application 140-1 and process 140-2 provides on display 130. Also in this example configuration, a repository 125 (e.g., a computer readable medium such as disk, disk storage system, etc.) stores files that are accessed by processes of computer system 110. The communications interface 115 enables the computer system 110 to communicate with other devices (i.e., other computers) on a network (not shown). This interface can allow access to the repository 125 from other remote users in addition to user 108.

Memory system 112 is any type of computer readable medium and in this example is encoded with an access log analyzer application 140-1 supporting generation, display, and implementation of functional operations of the graphical user interface 150 as explained herein. The access log analyzer application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the access log analyzer application 140-1. Execution of access log analyzer application 140-1 in this manner produces processing functionality in an access log analyzer process 140-2. In other words, the access log analyzer process 140-2 represents one or more portions or runtime instances of the access log analyzer application 140-1 (or the entire application 140-1) performing or executing within or upon the processor 113 in the computerized device 110 at runtime.

As discussed, access log analyzer process 140-2 generates graphical user interface 150. Graphical user interface 150 includes toolbar 205 for user 108 to control display of graphical representations 220, 222, and 224, each of which includes visual renderings of file accesses. For example, with respect to contents referenced in FIGS. 1 and 2, access log 155 tracks accesses initiated by multiple processes 121, 122 to multiple files 127 stored in repository 125. Each of the graphical representations 220, 222, 224, etc. represents a corresponding one of the accessed files 127 in repository 125. As will be discussed further in this application, the visual renderings in the graphical representations visually display information such as which of the multiple processes 121, 122 initiates accesses to a respective file, time of accesses, length of access, relative location of accesses, etc. Hand-controlled pointer 230 (e.g., via a mouse device) enables user 108 to scan over a region and view a zoomed in region as pointed by the arrow. Display region 210 displays an enlarged version of a region selected by pointer 230. Display regions 212, 214, and 216 include legends and statistical information associated with visual renderings of accesses displayed in graphical representations.

It should be noted that example configurations disclosed herein include the access log analyzer application 140-1 itself (i.e., in the form of un-executed or non-performing logic instructions and/or data) that is stored on a computer readable medium (such as a floppy disk), hard disk, electronic, magnetic, optical or other computer readable medium. The access log analyzer application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the access log analyzer application 140-1 in the processor 113 as the access log analyzer process 140-2. Those skilled in the art will understand that the computer system 110 may include other processes and/or software and hardware components or systems not shown in this example.

It should be noted that the access log analyzer 140 executed in computer system 110 is represented in FIG. 2 by either one or both of the access log analyzer application 140-1 and/or the access log analyzer process 140-2. For purposes of the discussion hereinafter, general reference will be made to the access log analyzer 140 as performing or supporting the various steps and functional operations to carry out techniques discussed herein.

Figure 3:
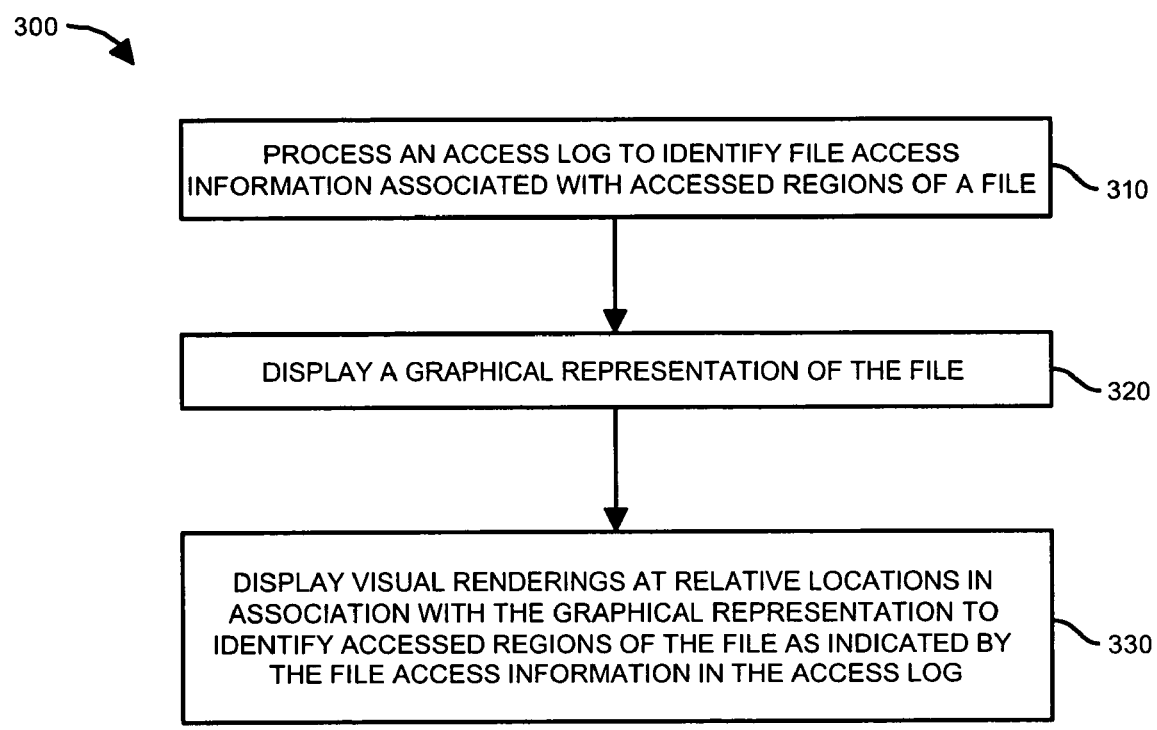
FIG. 3 is a flowchart illustrating a technique of displaying visual renderings of accesses that occur in a computer environment.

FIG. 3 is a flowchart 300 illustrating a technique of processing an access log and creating a visual depiction of the access log for viewing by a user 108.

In step 310, access log analyzer 140 processes an access log 155 to identify file access information associated with accessed regions of a file 127 in repository 125.

In step 320, access log analyzer 140 initiates display of a graphical representation 220 of the file 127.

In step 330, access log analyzer 140 initiates display of visual renderings (e.g., lines, bars, etc.) at relative locations in association with the graphical representation 220 to identify accessed regions of the file 127 as indicated by the file access information in the access log 155.

Figure 4:
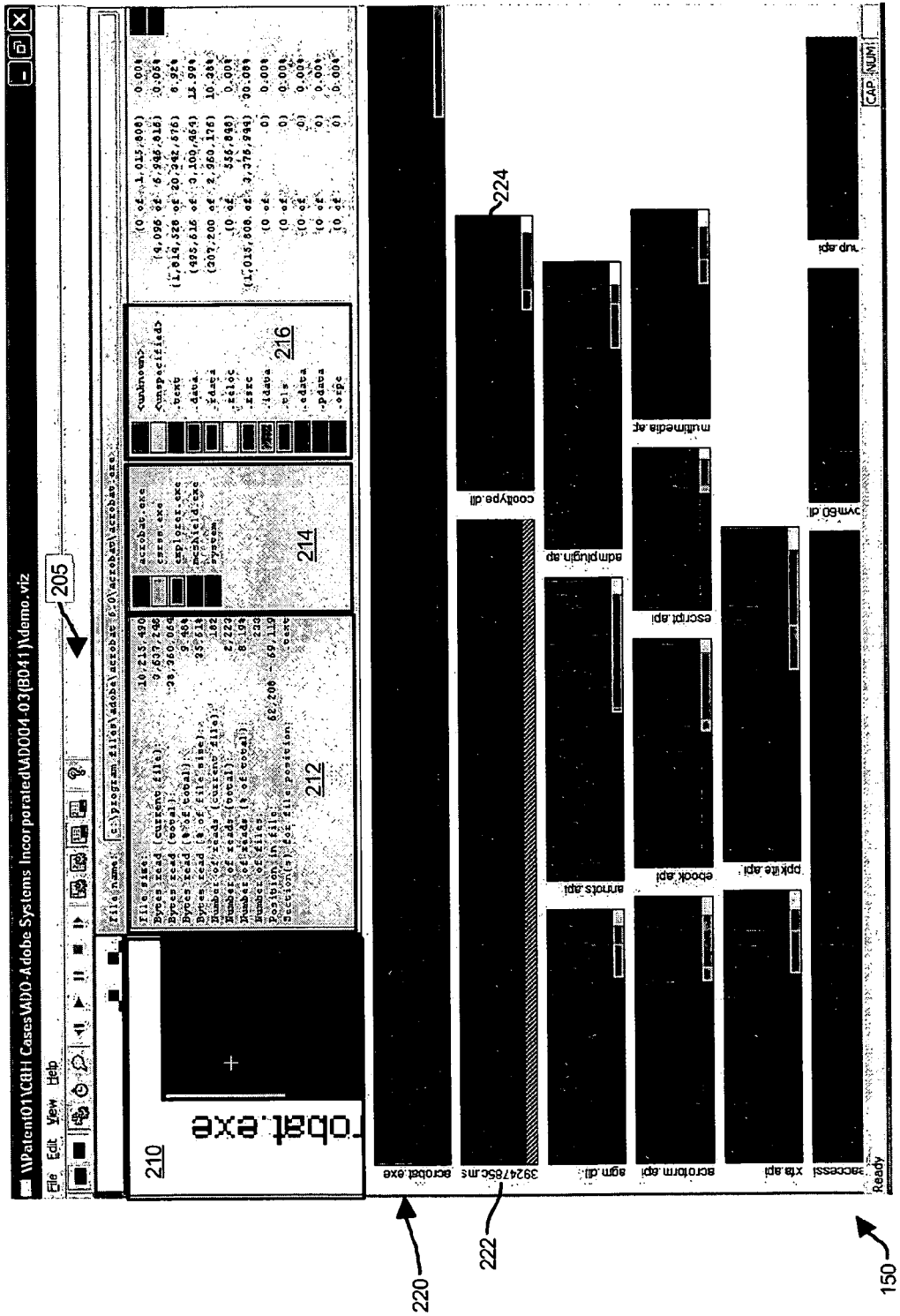
FIG. 4 is a diagram of a graphical user interface for displaying data access information.

FIG. 4 is a pictorial diagram of an example graphical user interface 150 according to techniques as discussed herein. As shown, tool bar 205 enables user 108 to select different icons and pull-down menus to select different display modes. Display region 210 illustrates a zoomed in view of a region of graphical representation 220 presently selected by pointer 230. Display regions 212, 214, and 216 include text to convey statistical information associated with logged accesses to files 127, which are represented by graphical representations 220, 222, and 224.

Graphical representations 220, 222, 224, etc. can be displayed in different ways depending on a user's selection. For example, user can select options in toolbar 205 to display graphical representations (in ascending or descending order) based on file extensions, number of bytes read from respective files, number of reads to respective files, ordering in log files, etc.

Figure 5:
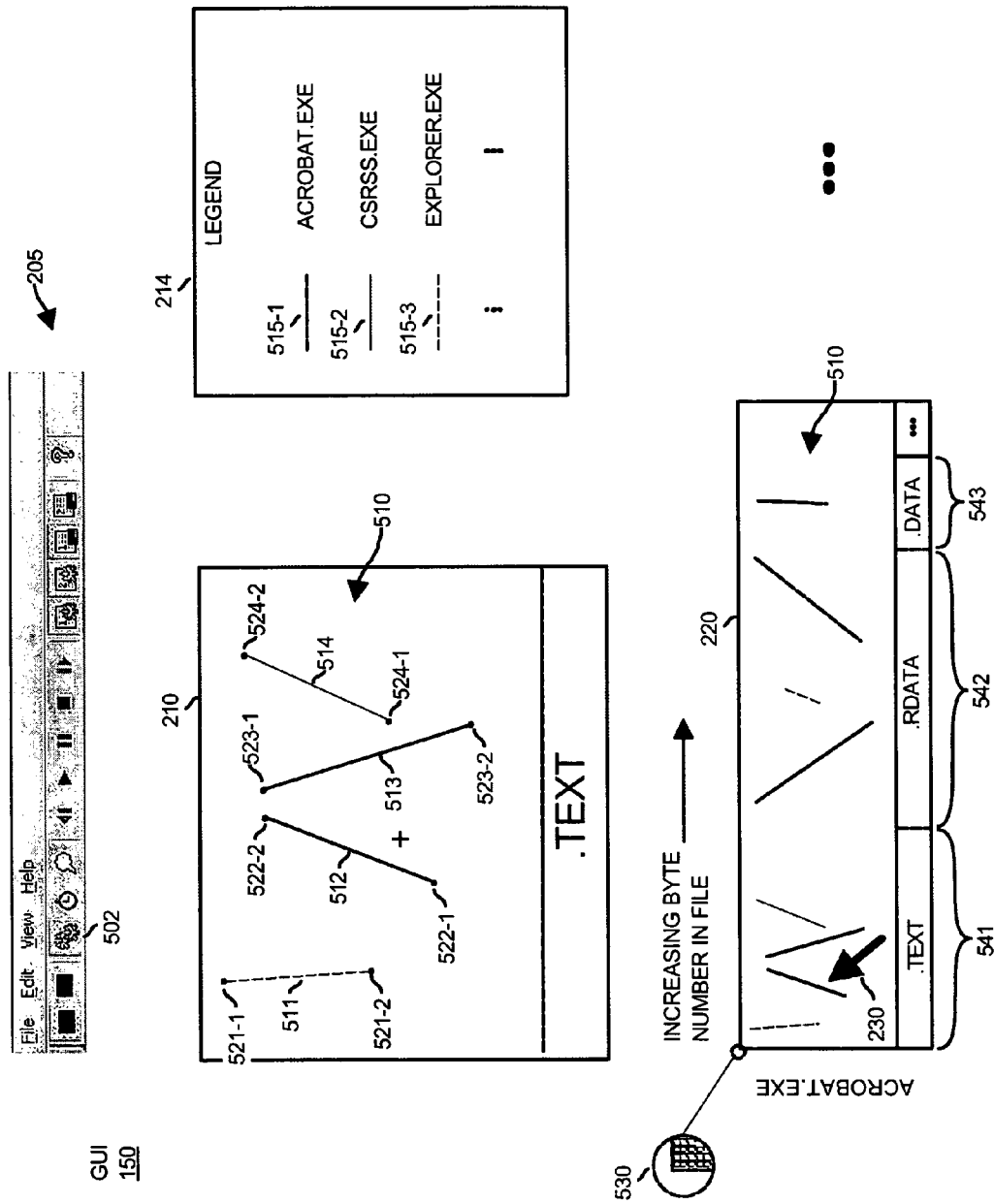
FIG. 5 is a diagram of elements of a graphical user interface including a graphical representation of a file and corresponding accesses that occurred by each of different processes.

FIG. 5 is a diagram more particularly illustrating tool bar 205, display regions 210 and 214, and graphical representation 220 of graphical user interface 150. In general, user 108 selects icon 502 of toolbar 205 for viewing of accesses without regard to when the accesses occur with respect to each other. Visual renderings 510 (e.g., angled lines) in graphical representation 220 represent accesses to a respective ACROBAT.EXE file. Legend 214 enables a user 108 to discern which of multiple processes 121 and 122 initiates a respective access to ACROBAT.EXE file represented by graphical representation 220. For example, patterns 515-1, 515-2, and 515-3 in legend 214 identify which processes perform the accesses illustrated in the graphical representations displayed in graphical user interface 150. Display regions 541, 542, and 543 enable the user 108 to identify which regions or ranges of a respective graphical representation (in this case graphical representation 220 associated with the ACROBAT.EXE file) correspond to different types of data in a represented file 127. In certain cases, access log analyzer 140 is unable to learn of the types of data associated with portions of a file. In such a circumstance, the access log analyzer 140 retains a specific pattern or color to indicate that the type of data in a respective is unascertainable or unspecified.

As discussed, according to one configuration of the present application, a log generator 145 monitors and thus keeps track of multiple processes 121 and 122 (e.g., ACROBAT.EXE, CSRSS.EXE, EXPLORER.EXE, MCSHIELD.EXE, OPERATING SYSTEM, etc.) that access multiple files 127 stored in a repository (e.g., a disk storage system) or a combination of disk 125 and cache 135. The access log analyzer 140 utilizes information in access log 155 to display graphical representations of files 127 accessed by the processes 121 and 122. For example, the access log analyzer 140 produces graphical representations 220, 222, and 224 (e.g., two dimensional images) representing respective accessed files 127. The access log analyzer 140 sizes each of the graphical representations 220, 222, and 224 depending on a size of a corresponding file 127 they represent. For example, larger files 127 have larger associated graphical representations while smaller files 127 have smaller associated graphical representations. As shown, graphical representation 220 (of ACROBAT.EXE file) represents a larger file 127 while graphical representation 224 (of COOLTYPE.DLL file) represents a relatively smaller file 127.

When displaying graphical representations 220, 222, and 224 of different sized accessed files 127 in this way, a user 108 can easily identify (based on a visual size of the graphical representations) a relative size of the accessed files 127 with respect to each other.

In certain cases, the access log analyzer 140 cannot ascertain an exact size of a respective file represented by graphical representations in graphical user interface 150. In such a case, the access log analyzer 140 can estimate a file size based on access information and display a graphical representation including a fuzzy region to indicate uncertainty with respect to exact file size so that user 108 is not mislead.

To further accommodate user 108, access log analyzer 140 provides a feature enabling the user 108 to modify how the graphical representations of accessed files 127 appear in the graphical user interface 150. For example, user 108 can set a value of the number of bytes to be represented by each pixel 530 for resizing the graphical representations and how they appear in graphical user interface 150. Also, the user 108 can adjust a height of the graphical representations by setting a number of pixels per vertical column of the graphical representations. Accordingly, based on this resizing feature, the user 108 can effectively zoom in and out of graphical representations for different types of viewing resolution.

One method of learning sizes associated with respective accessed files 127 is to retrieve such information from sources (e.g., disk, file system, file on disk, etc.) other than the access log 155. In other words, in certain cases, access log 155 does not include all of the information (such as a number of bytes associated with an accessed file) needed by access log analyzer 140 to generate graphical user interface 150. In such a case, access log analyzer 140 accesses file system 120, repository 125, and/or cache 135, etc. to obtain appropriate information to generate graphical user interface 150. Accordingly, access log analyzer 140 can access i) a repository associated with a file and/or ii) a file itself to learn of a respective size of the file as well as the different types of data associated with the file.

For the graphical representation 220 (as well as for each of the other graphical representations in graphical user interface 150), the access log analyzer 140 displays visual renderings 510 of accesses to a respective file (e.g., ACROBAT.EXE file) via use of a lines or filled in regions between a start byte and end byte associated with the given accesses. As mentioned, access log analyzer 140 sizes the graphical representations 220, 222, and 224 of graphical user interface 150 to be proportional to respective sizes of the files 127. One method of generating graphical representations to be proportional to the files is to assign each pixel 530 (e.g., display element) to be a certain predetermined number of bytes. A first pixel 530 in the top left hand corner of the graphical representation 220 represents a first portion of bytes in the ACROBAT.EXE file, a second pixel 530 below the first pixel 530 represents a second portion of bytes of the acrobat.exe contiguous with the first portion, and so on. Mapping of byte wraps such that each successive column to the right corresponds to a next contiguous range of bytes in the ACROBAT.EXE file enables access log analyzer 140 to generate a proportionally sized graphical representation of a respective file. Thus, each pixel 530 or column of pixels 530 in the graphical representation 220 represents a successive range of bytes in the ACROBAT.EXE file. As mentioned, a number of bytes per pixel 530 and, thus, sizes of the graphical representations in graphical user interface 150 can be adjusted by user 108.

In one application, based on mapping of bytes in a respective graphical representation 220, access log analyzer 140 displays a numerical value associated with a position of the pointer 230 so that the user 108 can move the arrow at different locations in the graphical representations 220 and identify an approximate (or nearly exact) byte location (to which the arrow points) in the graphical representations 220. Accordingly, the access log analyzer 140 enables a user 108 viewing the graphical representation 220 on a display screen 130 to scan across the graphical representation 220 using a hand-controlled pointer (e.g., input device 116) and, based on a current position of the hand-controlled pointer 230, the access log analyzer 140 provides a numerical value of a corresponding byte location (or range) in the respective file and therefore graphical representation 220. The user 108 therefore can move the pointer 230 over the visual renderings 510 (or corresponding start and stop indicators as will be discussed) to identify where respective accesses occur in the respective file.

Display region 210 illustrates a zoomed in view of a region selected by pointer 230 making it easier for the user 108 to see details of particular accesses to files 127 and, in this case, the ACROBAT.EXE file.

Access log analyzer 140 can provide a start indicator and an end indicator at a corresponding relative location of the graphical representation 220 to visually indicate relative positions of a respective beginning and end of a respective access to the files. For example, as shown in graphical representation 220 and more particularly in display region 210, access log analyzer 140 generates a series of display elements (e.g., lighted pixels) connecting a start indicator 521-1 and an end indicator 521-2 of the graphical representation 220 to identify a relative position in the file as well as a relative size associated with visual rendering 511 of a respective access in ACROBAT.EXE file.

In one application, user 108 can select between one view mode (as shown) in which access log analyzer 140 displays a respective access as a line between a respective start indicator and stop indicator. While set to another mode (e.g., a bar mode), access log analyzer 140 fills in vertical bars in the graphical representation 220 between a respective start indicator and stop indicator to identify a respective visual rendering of an access. Access log analyzer can generate start and stop indicators to be different colors to differentiate them from a line or bars connecting them.

As shown in display region 210 (e.g., zoomed in region to which pointer 230 points) of graphical user interface 150, visual rendering 511 (a zoomed in version of one of the visual renderings 510 in graphical representation 220 below) illustrates a respective access to an ACROBAT.EXE file 127 that occurs via an EXPLORER.EXE application (e.g., process 121). The visual rendering 511 appears at a relative position along a length and width of the graphical representation 220 depending where the respective access occurred in the acrobat.exe file based on pixel mapping as discussed above. That is, the access log analyzer 140 displays a visual rendering 511 of the given access so that it appears at a relative position in the respective graphical representation 220 so that the user 108 can view the respective graphical representation 220 and quickly identify whether the given access (and its respective start and end positions) occurred at the beginning, middle, or end of the file. Based on a size of the visual rendering 511 of a respective access in relation to the corresponding graphical representation 220 of the ACROBAT.EXE file, the user 108 can identify a relative size of a respective access with respect to a relative size of the ACROBAT.EXE file.

Recall as discussed above that the visual renderings 510 of accesses to files can be uniquely displayed via use of different display attributes (e.g., colors, patterns, etc.) in order to differentiate one type of processes accessing the file versus another. In addition to using unique patterns as mentioned above, the access log analyzer 140 can "color code" the visual renderings of accesses in the graphical representations to differentiate which of multiple processes 121 and 122 performs respective accesses to the files 127. In this configuration, all visual renderings of accesses of a first color are performed by a first process (e.g., ACROBAT.EXE) accessing the file, all visual renderings of accesses of a second color are performed by a second process (e.g., CRSS.EXE) accessing the file, and so on.

As shown, a range of bytes in graphical representation 220 above display region 541 indicates ".text" data regions associated with ACROBAT.EXE file, a range of bytes in graphical representation 220 above display region 542 indicates ".rdata" data regions associated with ACROBAT.EXE file, a range of bytes in graphical representation 220 above display region 543 indicates ".data" data regions associated with ACROBAT.EXE file, and so on. Each of the other graphical representations (e.g., graphical representation 222, graphical representation 224, etc.) can include a similar bar beneath a graphical representation to identify data types for regions in a respective graphical representation and file 127.

Note that in one embodiment, display regions (e.g., display regions 541, 542, and 543) are color-coded (or patterned) rather than being filled in with appropriate text as shown to indicate data types for regions of a respective file. In such an application, display region 216 (as in FIG. 4) includes a color-coded legend (or pattern legend) for the user 108 to match and identify the different types of data regions in a respective file. Accordingly, a user 108 viewing the graphical representation can quickly identify a type of data associated with a particular access to a respective file as well as which portions of the respective file store which types of data.

Referring again to display region 214 of FIG. 5, each of visual renderings 511, 512, 513, and 514 includes a respective start indicator and end indicator associated with a respective file access. For example, visual rendering 511 has a corresponding start indicator 521-1 and stop indicator 521-2 of an associated access to file ACROBAT.EXE, visual rendering 512 has a corresponding start indicator 522-1 and stop indicator 522-2 of an associated access to file ACROBAT.EXE, visual rendering 513 has a corresponding start indicator 523-1 and stop indicator 523-2 of an associated access to file ACROBAT.EXE, and visual rendering 514 has a corresponding start indicator 524-1 and stop indicator 524-2 of an associated access to file ACROBAT.EXE. Note that all of these respective accesses are associated with ".text" type data of the ACROBAT.EXE file. Further note that respective visual renderings 510 in display region 210 indicate which of multiple processes in legend 214 performs a respective access. For example, visual rendering 511 identifies a respective access initiated by process EXPLORER.EXE, visual rendering 512 identifies a respective access initiated by process ACROBAT.EXE, visual rendering 513 identifies a respective access initiated by process ACROBAT.EXE, and, lastly, visual rendering 514 identifies a respective access initiated by process CSRSS.EXE. As shown, the access log analyzer 140 can space the visual renderings 510 at proportional positions in the graphical representation 220 to indicate respective relative positions of non-contiguous accesses occurring with respect to the ACROBAT.EXE file.

In one application, the user 108 can select or filter which types of accesses to display in graphical representation 220. For example, as shown in FIG. 5, the access log analyzer 140 initiates display of graphical representation 220 including accesses by processes ACROBAT.EXE, CSRSS.EXE, EXPLORER.EXE, etc. The user 108 may decide to view accesses associated with certain processes and not others. For example, the user 108 may decide to view accesses only by ACROBAT.EXE. In such a case, the user 108 can activate (by toggling a respective process ON or OFF) display of patterns 515-1, and deactivate display of patterns 515-2, 515-3, etc. so that only visual renderings as identified by the ACROBAT.EXE pattern 515-1 are "active" for display. Based on this setting, access log analyzer 140 discontinues displaying visual rendering of accesses (e.g., visual rendering 511, visual rendering 514, etc.) by processes other than ACROBAT.EXE. Accordingly, in response to the access log analyzer 140 receiving a selection by a user 108 viewing the graphical representation 220 to display a set of visual renderings 510 of accesses to files 127 performed by a selected one or more of multiple processes 121 and 122 having accessed the file 127, the access log analyzer 140 displays the set of visual renderings 510 of accesses to the files 127 initiated by the selected one or more processes in lieu of displaying visual renderings of all accesses to the files by all of the multiple processes. This enables the user 108 to control what is displayed in graphical user interface 150 and more easily analyze access patterns.

In one application, access log analyzer 140 enables user 108 to selectively display accesses to a file that result in cache 135 hits. For example, the user 108 can select an option in toolbar 205 to turn ON and OFF visual renderings of accesses to a respective file that occur as a result of reading from cache 135 instead of accessing a disk upon which the respective file resides. Also, access log analyzer 140 can selectively display disk cache read-aheads (e.g., speculative reads to a disk performed by a cache manager of the cache 135 prior to an actual request for access by a process) associated with the different processes 121 and 122 depending on display mode settings of graphical user interface 150. Both of these features enable the user to get a clearer picture of disk accesses and respective access patterns.

Figure 6:
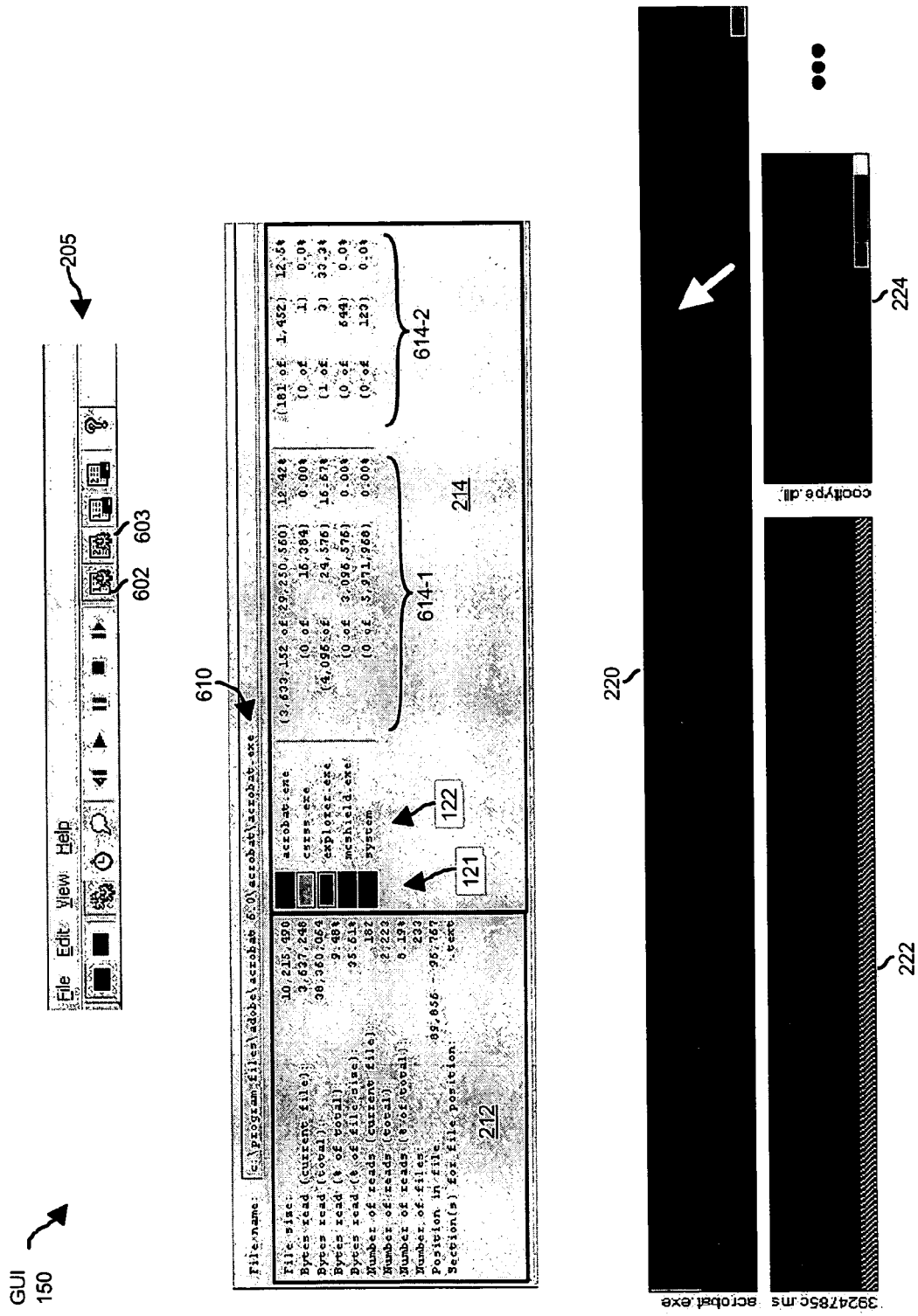
FIG. 6 is a diagram illustrating statistical information associated with accesses to one of multiple selected graphical representations of files.

FIG. 6 is a diagram illustrating further details of graphical user interface 150. For example, data field 610 identifies a file name and/or path associated with a file associated with a currently selected graphical representation 220 identified by pointer 230. In this example, pointer 230 selects graphical representation 220 of the ACROBAT.EXE file.

Display region 212 includes statistical access information associated with the selected ACROBAT.EXE file. For example, "File size" in display region 212 identifies a number of bytes or size associated with the selected file. "Bytes read (current file):" indicates a number of bytes read in the selected file by processes 121 and 122 shown in legend 214. "Bytes read (total):" identifies a total number of bytes read by processes 121 and 122 shown in legend 214 for all files displayed in graphical user interface 150, not just the file selected by pointer 230. "Bytes read (% of total):" identifies a proportion of bytes read from the selected ACROBAT.EXE compared to all bytes read from all files by processes 121 and 122 shown in legend 214. "Bytes read (% of file size):" identifies a percentage of total bytes that have been read from the ACROBAT.EXE file by processes 121 and 122 shown in legend 214. "Number of reads (current file):" indicates a number of accesses occurring in the selected file by processes 121 and 122 shown in legend 214. "Number of reads (total):" indicates a number of accesses occurring to all files (represented by graphical representations) displayed in graphical user interface 150 as initiated by processes 121 and 122 shown in legend 214. "Number of reads (% of total):" indicates which percentage of all file accesses to all files in graphical user interface 150 occurs with respect to the presently selected ACROBAT.EXE file. "Number of files" indicates a number of graphical representations of corresponding files displayed in graphical user interface 150. "Position in file" identifies a relative byte position of pointer 230 in the selected ACROBAT.EXE file represented by graphical representation 220. "Section for file position:" identifies a type of data associated with data at a corresponding position of the pointer 230 in the selected file.

Selection of icon 602 and icon 603 in FIG. 6 prompts access log analyzer 140 to display respective columns 614-1 and 614-2 in display region 214. Column 614-1 identifies a respective number of bytes read from ACROBAT.EXE file (as represented by graphical representation 220) initiated by each of the processes ACROBAT.EXE, CSRSS.EXE, EXPLORER.EXE, MCSHIELD.EXE, and OPERATING SYSTEM. For example, column 614-1 indicates that the ACROBAT.EXE process accesses 3,533,152 bytes from the ACROBAT.EXE file. Column 614-1 further indicates that the total number of bytes accessed by ACROBAT.EXE for all 233 accessed files displayed in graphical user interface 150 is 29,250,560. The percentage of bytes accessed from the presently selected ACROBAT.EXE file is 12.42% of all accessed bytes of all files in graphical user interface 150. Other entries in column 614-1 display similar statistics for each of the processes.

Access log analyzer 140 displays further statistical data via column 614-2. However, column 614-2 displays a number of accesses associated with the processes and files rather than a number of accessed bytes. For example, the ACROBAT.EXE process accesses the selected ACROBAT.EXE file 181 times. The ACROBAT.EXE process accesses all of the files (total of 233 files, each represented by a corresponding graphical representation) displayed in graphical user interface 150 a total of 1452 times. The percentage of accesses by the ACROBAT.EXE process to the selected ACROBAT.EXE file compared to all accesses is 12.5%. Other entries in column 614-2 display similar statistics for each of the processes.

Figure 7:
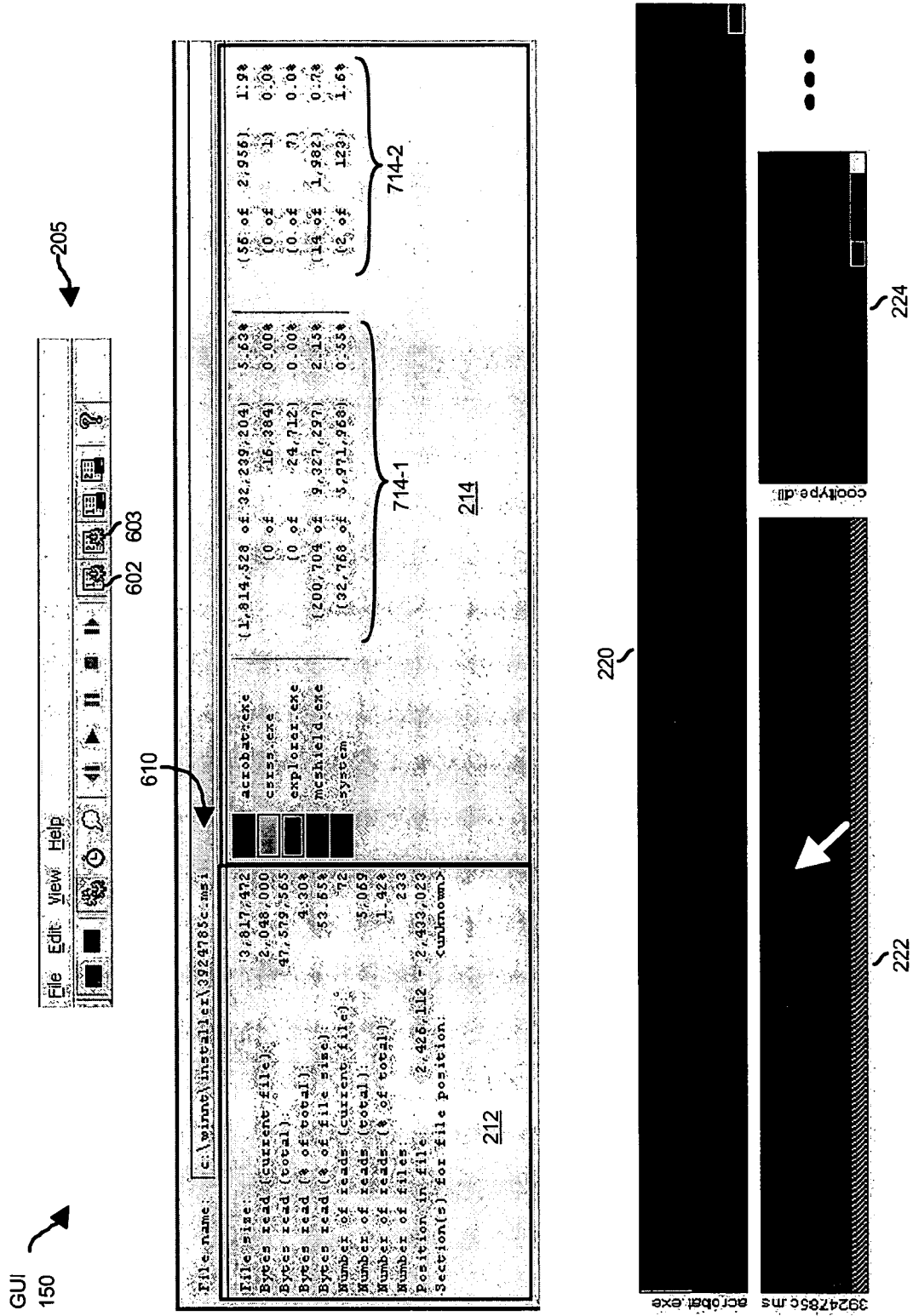
FIG. 7 is a diagram illustrating statistical information associated with accesses to one of multiple selected graphical representations of files.

FIG. 7 is a diagram illustrating further details of graphical user interface 150 similar to that of previous FIG. 6. However, in this example, via pointer 230, user 108 selects graphical representation 222 corresponding to file 3924785c.ms as shown in data field 610. Consequently, column 714-1 and column 714-2 in display region 214 each include statistical information with respect to file 3924785c.ms. Display region 212 also includes statistical information associated with file 3924785c.ms. For example, as indicated, the size of the file is 3,817,472 bytes; the number of bytes read from the file is 2,048,000; and so on.

Figure 8:
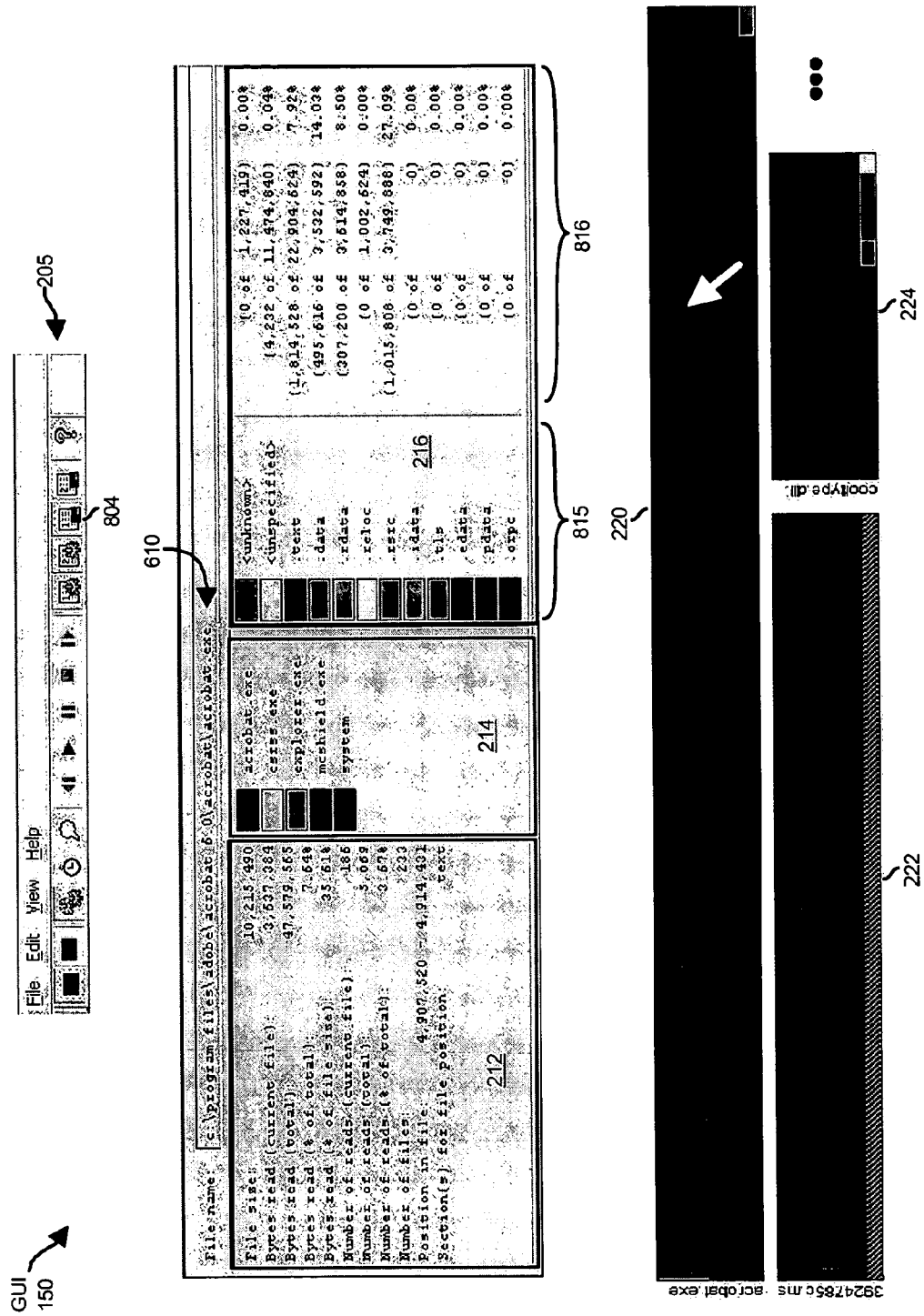
FIG. 8 is a diagram illustrating statistical information associated with accesses to one of multiple selected graphical representations of files.

FIG. 8 is a diagram illustrating further details of graphical user interface 150. To expand display region 216 to include column 816, user clicks on icon 804. To minimize display region 216 again and delete column 816, user clicks on icon 804 again. Legend 815 in display region 216 remains even after deleting column 816. Accordingly, repeated clicking on icon 804 toggles display of column 816 on and off.

As previously discussed, legend 815 includes a listing of data types associated with the files 127 represented by respective graphical representations in graphical user interface 150. For a respective data type in legend 815, column 816 includes a listing of statistical access information such as a number of bytes read for the corresponding data type for the selected file (in this case file ACROBAT.EXE) versus a total number of accessed bytes for the corresponding data type for all of the files displayed in graphical user interface 150. For example, a corresponding entry for ".text" in legend 815 includes the string "(1,814,528 of 6,205,440) 29.24%" in column 816. Thus, the selected ACROBAT.EXE file has 1,814,528 bytes of accessed ".text" type data compared to a total of 6,205,440 bytes of accessed ".text" type data for a combination of all of the files. For a following entry, the selected ACROBAT.EXE file has 495,616 bytes of accessed ".data" type data compared to a total of 557,056 bytes of accessed ".data" type data for a combination of all of the displayed graphical representations of files, and so on. As the user 108 steers and places pointer 230 over other graphical representations of files, access log analyzer 140 displays statistical information with respect to the selected file. Accordingly, a user 108 can easily select which of the files to display statistical information for viewing in column 816.

Figure 9:
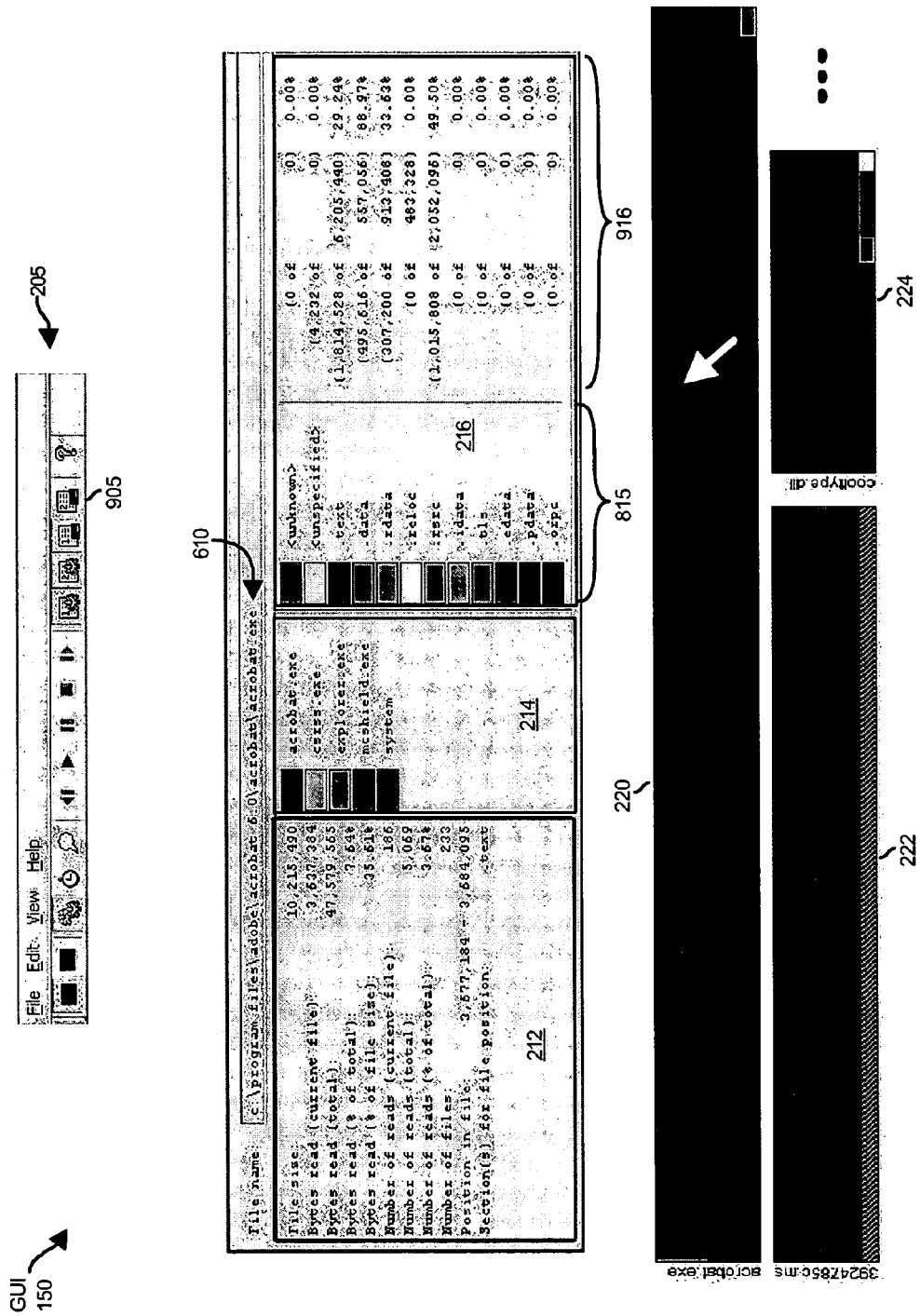
FIG. 9 is a diagram illustrating statistical information associated with accesses to one of multiple selected graphical representations of files.

FIG. 9 is a diagram illustrating further details of graphical user interface 150. To expand display region 216 to include column 916, user 108 clicks on icon 905. To minimize display region 216 again and delete column 916, user clicks on icon 905 again. Accordingly, clicking on icon 905 in toolbar 205 toggles displaying of column 916 on and off.

As previously discussed, legend 815 includes a listing of data types associated with the files 127 represented by respective graphical representations in graphical user interface 150. For a respective data type in legend 815, column 916 includes statistical access information such as a listing of a number of bytes read for the corresponding data type for the selected file (in this case file ACROBAT.EXE) versus a total number of accessible bytes for the corresponding data type the selected file displayed in graphical user interface 150. For example, a corresponding entry for ".text" includes the string "(1,814, 528 of 6,205,440) 29.24%." Thus, the selected ACROBAT.EXE file has 1,814,528 bytes of ".text" type data that has been accessed compared to a total of 6,205,440 bytes of accessible ".text" type data for the selected file. For a following entry, the selected ACROBAT.EXE file has 495,616 bytes of ".data" type data that has been accessed compared to a total of 557,056 bytes of ".data" type data accessible from the selected file. As the user 108 steers and places pointer 230 over other graphical representations of files, access log analyzer 140 displays similar statistical information with respect to other selected files. Accordingly, a user 108 can easily select which of the files to display statistical information for viewing in column 916.

Figure 10:
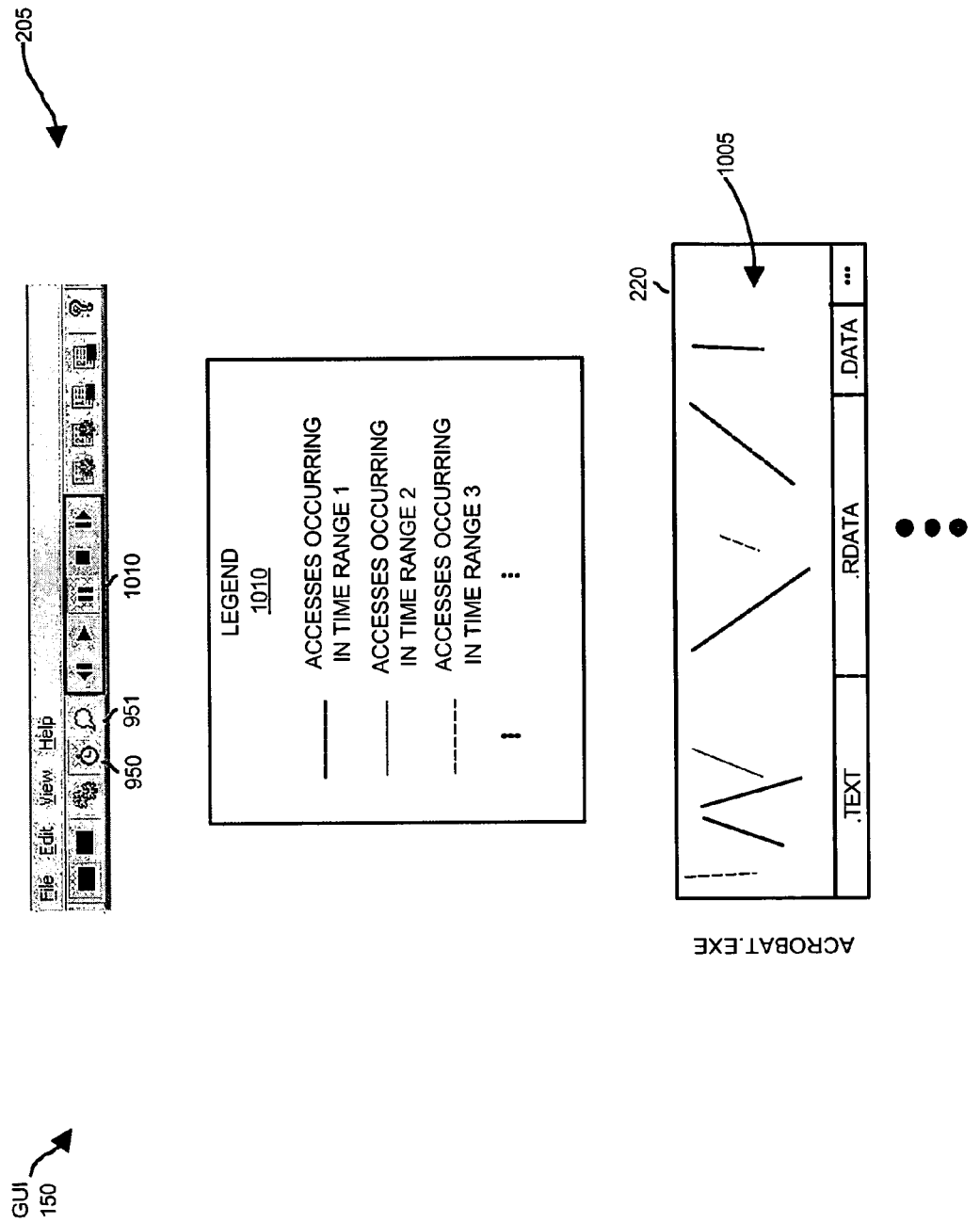
FIG. 10 is a diagram illustrating a technique of displaying a relative time when accesses occur in a file.

FIG. 10 is a diagram illustrating further operational modes of graphical user interface 150. As shown, tool bar 205 includes icon 950 for selecting a time related viewing mode in which visual renderings 1005 of accesses to the graphical representations of files are coded to enable the user 108 to identify a relative time when the accesses occur with respect to each other. For example, the access log analyzer 140 can highlight regions between the start indicators and the respective end indicators of the respective visual renderings of accesses with distinctive attributes (e.g., color, pattern, etc.) to visually indicate a relative time when the accesses occur with respect to each other.

As shown in legend 1010, the different patterns indicate a time range during which an access occurs. In one application, the access log analyzer 140 color-codes the visual renderings 1005 of accesses of the graphical representations with one of a spectrum of colors (e.g., red, orange, yellow, green, blue, indigo and violet) to indicate a relative time when the respective accesses occur. For example, access log analyzer 140 displays visual renderings of accesses occurring first in a series of accesses as red. Access log analyzer 140 displays a next set of accesses in a series of accesses as orange, a next set of accesses in a series of accesses as yellow, and so on. Accordingly, the user can visually identify a relative time when accesses occur in respective graphical representations of files based on a color of the visual renderings in those files.

To further enhance a user's experience of analyzing access information, access log analyzer 140 displays icons 1010 enabling a user 108 to "play back" occurrences of accesses to the files represented by graphical representations. For example, access log analyzer 140 enables user 108 to select a display mode that results in the graphical representations 220 being successively populated over time with the visual renderings 1005, which depict different accesses to the files, to indicate relative times when the different accesses occurred in the file. The visual renderings 1005 can be color-coded as discussed above via use of legend 1010. Accordingly, user 108 can more easily identify when the accesses occur with respect to each other.

In one application, icons 1010 displayed by access log analyzer 140 enable a user 108 to manually initiate a forward or backward rate at which the visual renderings 1005 of accesses are displayed or "undisplayed" in graphical user interface 150. In other words, the user 108 can click a play icon to initiate population or removal of each successive visual rendering of an access to the respective files. This also enables the user 108 to more easily determine when the different accesses occur in the file relative to each other.

On a final note, icon 950 of toolbar 205 enables a user 108 to switch the time-based viewing mode as shown to a mode for displaying groupings of accesses in graphical user interface 150 irrespective of the processes that execute them. In this latter mode, the graphical user interface 150 provides a legend for user 108 to identify an occurrence of different bins of accesses. For example, a marker in software code executed by the user 108 causes an access to occur to some designated file location associated with a respective software function in executed code. The access log 155 used by access log analyzer 140 to generate the graphical user interface 150 tracks the occurrence of these accesses. Access log analyzer 140 bins the accesses according to the corresponding software function initiating the accesses so that, when access log analyzer 140 displays the graphical representations in graphical user interface 150, a user 108 can identify what portions of code and potentially when the portions of code gets executed. This provides a way for a user 108 to perform troubleshooting via use of the access log analyzer 140.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method for analyzing access log information, the method comprising:
    processing an access log to identify file access information associated with accessed regions of a file;
    displaying a graphical representation of the file; and
    displaying visual renderings at relative locations in association with the graphical representation to identify accessed regions of the file as indicated by the file access information in the access log, a first visual rendering in the graphical representation indicating an access by a first process of multiple processes, a second visual rendering in the graphical representation indicating an access by a second process of the multiple processes;
    wherein displaying the graphical representation includes:
        displaying the graphical representation of the file on a display screen to be proportional in size to a respective size of the file;
        providing a start indicator and an end indicator at a corresponding relative location of the graphical representation to visually indicate relative positions of a respective beginning and end of a respective access to the file; and
        generating a series of display elements connecting the start indicator and the end indicator of the graphical representation to identify a relative position of the respective access in the file as well as a relative size associated with the respective access, the series of display elements forming a diagonal segment from the start indicator to the end indicator.

2. A method as in claim 1 further comprising:
    displaying the series of display elements with distinctive attributes to indicate that the respective access was initiated by a particular process of the multiple processes initiating access to the file; and
    providing a legend to indicate that the distinctive attributes of the series of display elements pertain to accesses initiated by the particular process and that the particular process initiated the respective access to the file.

3. A method as in claim 1, wherein displaying the graphical representation of the file includes displaying the graphical representation as a field of pixels, each pixel in the field corresponding to a number of bytes in the file; and
    wherein displaying the visual renderings includes: i) displaying the start indicator in a first column of the field, the start indicator representing a start location in the file for a given access, and ii) displaying the end indicator in a second column of the field, the end indicator representing an end location in the file for the given access.

4. A method as in claim 3 further comprising:
    in a display region separate from the field of pixels, displaying range information in relation to the field of pixels to indicate regions of different types of data in the file.

5. A method as in claim 4 further comprising:
    accessing at least one of: i) a repository associated with the file and ii) the file itself to learn of the respective size of the file as well as the different types of data associated with the file.

6. A method as in claim 3 further comprising:
    providing a visual indication between the start indicator in the first column of the field and the end indicator in the second column of the field, the visual indication representing a relative location of data in the file being accessed for the given access.

7. A method as in claim 1 further comprising:
    enabling steering of a pointer across the graphical representation on the display screen; and
    in a display region in relation to the graphical representation of the file, simultaneously displaying a zoomed in view of respective regions of the graphical representation as identified by the pointer.

8. A method as in claim 1 further comprising:
    simultaneously displaying additional graphical representations of respective accessed files including: i) sizing each of the additional graphical representations of the respective accessed files to be proportional to a corresponding size of the respective file being represented, and ii) for each of the additional graphical representations, providing start indicators and respective end indicators at relative locations of the additional graphical representations to visually indicate a relative position of accesses in the respective accessed files.

9. A method as in claim 8 further comprising:
    highlighting regions between the start indicators and the respective end indicators of the accesses with distinctive attributes to visually indicate a relative time when at least a first access to the accessed files was made with respect to at least a second access to the accessed files.

10. A method as in claim 1 further comprising:
    enabling a display mode that, when selected, results in the graphical representation being successively populated over time with the visual renderings, which depict different accesses to the file, to indicate relative times when the different accesses occurred in the file.

11. A method as in claim 10 further comprising:
    enabling selection of a rate at which the visual renderings are displayed on a display screen to determine when the different accesses occurred in the file relative to each other.

12. A method as in claim 1 further comprising:
    providing a pointer to scan across the graphical representation; and
    based on a current position of the pointer over a region of the graphical representation, providing a numerical display of a corresponding byte location in the file that corresponds to the region of the graphical representation identified by the pointer.

13. A method as in claim 1 further comprising:
    receiving a selection to display only a set of visual renderings representing accesses to the file performed by the first process; and in response to the selection:
displaying the set of visual renderings representing accesses to the file initiated by the first process, and discontinuing display of a set of visual renderings representing accesses to the file by the second process.

14. A method as in claim 1, wherein displaying the visual renderings includes:
spacing the visual renderings at proportional positions in the graphical representation to indicate respective relative positions of non-contiguous accesses occurring with respect to the file.

15. A method as in claim 1 further comprising:
enabling selection of the graphical representation which is one of multiple graphical representations of corresponding files accessed by multiple processes running on a computer; and
in a display region provided in relation to the multiple graphical representations of files, displaying a first set of statistical information associated with a selected graphical representation in relation to a second set of statistical information associated with the multiple graphical representations as a whole.

16. A method as in claim 1 further comprising:
enabling selection of a filter mode in which the graphical representation includes visual renderings of accesses to the file stored on a storage disk rather than accesses to the file occurring as a result of accessing a cached portion of the file from a cache separate from the storage disk.

17. A method as in claim 1 further comprising:
enabling selection of the graphical representation which is one of multiple graphical representations of corresponding files accessed by the multiple processes running on a computer;
in a display region provided in relation to the multiple graphical representations of files, displaying a legend of distinctive attributes associated with the visual renderings to identify which accesses in the graphical representations were performed by which of the multiple processes that access the file; and
in relation to the legend, providing respective statistical access information associated with each of the multiple processes for the selected graphical representation.

18. A method as in claim 1 further comprising:
enabling selection of the graphical representation which is one of multiple graphical representations of corresponding files accessed by multiple processes running on a computer;
in a display region provided in relation to the multiple graphical representations of files, displaying a legend of different attributes to identify different types of data regions associated with the multiple graphical representations and corresponding files; and
in relation to the legend, providing statistical information associated with the different types of data regions for the selected graphical representation.

19. A method as in claim 1, wherein displaying the visual renderings includes:
displaying, in the graphical representation, a first segment between a corresponding start and end location of the access by the first process;
displaying, in the graphical representation, a second segment between a corresponding start and end location of the access by the second process; and
displaying the first segment in a visually distinct manner than the second segment to indicate that the first process of the multiple processes initiated the access as represented by the first segment and that the second process of the multiple processes initiated the access as represented by the second segment.

20. A method as in claim 19 further comprising:
displaying a first set of visual renderings in the graphical representation to indicate accesses to the file by the first process;
displaying a second set of visual renderings in the graphical representation to indicate accesses to the file by the second process; and
in response to receiving input to filter the second set of visual renderings from the graphical representation, discontinuing display of the second set of visual renderings in the graphical representation.

21. A computer system for analyzing access log information, the computer system comprising:
a processor;
a memory unit that stores instructions associated with an application executed by the processor; and
an interconnect coupling the processor and the memory unit, enabling the computer system to execute the application and perform operations of:
processing an access log to identify file access information associated with accessed regions of a file;
displaying a graphical representation of the file;
displaying the graphical representation as a field of pixels including multiple adjacent columns of pixels, each of the adjacent columns being of substantially equal length, each pixel in the field corresponding to an amount of storage capacity in the file; and
displaying visual renderings at relative locations in the field to identify accessed regions of the file as indicated by the file access information in the access log;
wherein displaying the graphical representation includes:
displaying the graphical representation of the file on a display screen to be proportional in size to a respective size of the file;
providing a start indicator and an end indicator at a corresponding relative location of the graphical representation to visually indicate relative positions of a respective beginning and end of a respective access to the file; and
generating a series of display elements connecting the start indicator and the end indicator of the graphical representation to identify a relative position of the respective access in the file as well as a relative size associated with the respective access, the series of display elements forming a diagonal segment from the start indicator to the end indicator.

22. A computer system as in claim 21, wherein displaying the graphical representation includes:
sizing the graphical representation of the file on the display screen to be proportional to a respective size of the file;
providing the start indicator and the end indicator at a corresponding relative location of the graphical representation to visually indicate relative positions of a respective beginning and end of a respective access to the file.

23. A computer system as in claim 22 further supporting operations of:
displaying the series of display elements with distinctive attributes to indicate that the respective access was initiated by a corresponding process of multiple processes initiating access to the file; and
providing a legend to indicate that the distinctive attributes of the series of display elements pertain to accesses

19 initiated by the corresponding process and that the corresponding process initiated the respective access to the file.

24. A computer system as in claim 22, wherein displaying the graphical representation includes:
providing a display region in relation to the graphical representation to identify ranges of different types of data associated with the graphical representation of the file as well as to identify types of data associated with accesses to the file.

25. A computer system as in claim 21 further supporting operations of:
displaying additional graphical representations of respective accessed files including: i) sizing each of the additional graphical representations of the respective accessed files to be proportional to a corresponding size of a respective file being represented, and ii) for each of the additional graphical representations, providing start indicators and respective end indicators at relative locations of the additional graphical representations to visually indicate a relative position of accesses in the respective accessed files.

26. A computer system as in claim 25 further supporting operations of:
highlighting regions between the start indicators and the respective end indicators of the accesses with distinctive attributes to visually indicate a relative time when at least a first access to the accessed files was made with respect to at least a second access to the accessed files.

27. A computer program product including a computer-storage medium having instructions stored thereon for processing data information, such that the instructions, when carried out by a processing device, enable the processing device to perform the steps of:
processing an access log to identify file access information associated with accessed regions of a file;
displaying a graphical representation of the file; and
displaying visual renderings at relative locations in association with the graphical representation to identify accessed regions of the file as indicated by the file access information in the access log, each of at least two of the visual renderings indicating: i) a size of a respective access to the file, and ii) which of multiple processes initiated the respective access;
wherein displaying the graphical representation includes:
displaying the graphical representation of the file on a display screen to be proportional in size to a respective size of the file;
providing a start indicator and an end indicator at a corresponding relative location of the graphical representation to visually indicate relative positions of a respective beginning and end of a respective access to the file; and
generating a series of display elements connecting the start indicator and the end indicator of the graphical representation to identify a relative position of the respective access in the file as well as a relative size associated with the respective access, the series of display elements forming a diagonal segment from the start indicator to the end indicator.

28. A computer program product as in claim 27 further supporting operations of:
enabling a display mode that, when selected, results in the graphical representation being successively populated over time with the visual renderings, which depict different accesses to the file, to indicate relative times when the different accesses occurred in the file.

20

29. A computer program product as in claim 28 further supporting operations of:
enabling selection of a manual rate at which the visual renderings are displayed on the display screen to determine when the different accesses occurred in the file relative to each other.

30. A computer program product as in claim 27 further supporting operations of:
enabling a user viewing the graphical representation on the display screen to scan across the graphical representation using a pointer; and
based on a current position of the pointer over a region of the graphical representation, providing a numerical display of a corresponding byte location in the file that corresponds to the region of the graphical representation identified by the pointer.

31. A computer program product as in claim 27 further supporting operations of:
receiving a selection to display a set of visual renderings of accesses to the file performed by at least one of multiple processes having accessed the file; and
in response to the selection, displaying the set of visual renderings of accesses to the file initiated by the at least one of multiple processes in lieu of displaying visual renderings of accesses to the file by all of the multiple processes.

32. A computer program product as in claim 27, wherein displaying the visual renderings includes:
spacing the visual renderings at proportional positions in the graphical representation to indicate respective relative positions of non-contiguous accesses occurring with respect to the file.

33. A computer program product as in claim 27 further supporting operations of:
enabling selection of the graphical representation which is one of multiple graphical representations of corresponding files accessed by multiple processes running on a computer; and
in a display region provided in relation to the multiple graphical representations of files, displaying a first set of statistical information associated with the selected graphical representation in relation to a second set of statistical information associated with the multiple graphical representations as a whole.

34. A computer system for analyzing access log information, the computer system including:
means for processing an access log to identify file access information associated with accessed regions of a file;
means for displaying a graphical representation of the file; and
means for displaying visual renderings at relative locations in association with the graphical representation to identify accessed regions of the file as indicated by the file access information in the access log, a first visual rendering in the graphical representation indicating an access by a first process of multiple processes, a second visual rendering in the graphical representation indicating an access by a second process of the multiple processes;
wherein means for displaying the graphical representation includes:
means for displaying the graphical representation of the file on a display screen to be proportional in size to a respective size of the file;
means for providing a start indicator and an end indicator at a corresponding relative location of the graphical representation to visually indicate relative positions of a respective beginning and end of a respective access to the file; and means for generating a series of display elements connecting the start indicator and the end indicator of the graphical representation to identify a relative position of the respective access in the file as well as a relative size associated with the respective access, the series of display elements forming a diagonal segment from the start indicator to the end indicator.

* * * * *